(12) United States Patent
Rasch et al.

(10) Patent No.: US 11,443,176 B2
(45) Date of Patent: Sep. 13, 2022

(54) ACCELERATION OF CONVOLUTIONAL NEURAL NETWORKS ON ANALOG ARRAYS

(71) Applicant: International Business Machines Corporation, Armonk, NY (US)

(72) Inventors: Malte Rasch, Chappaqua, NY (US); Tayfun Gokmen, Briarcliff Manor, NY (US); Mattia Rigotti, New York, NY (US); Wilfried Haensch, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 16/362,031

(22) Filed: Mar. 22, 2019

(65) Prior Publication Data

US 2019/0354847 A1 Nov. 21, 2019

Related U.S. Application Data

(60) Provisional application No. 62/673,106, filed on May 17, 2018.

(51) Int. Cl.
| | |
|---|---|
| *G06N 3/063* | (2006.01) |
| *G06N 3/08* | (2006.01) |
| *G06T 7/11* | (2017.01) |

(52) U.S. Cl.
CPC ........... *G06N 3/0635* (2013.01); *G06N 3/084* (2013.01); *G06T 7/11* (2017.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,817,153 | B2 | 8/2014 | Bahukhandi et al. |
| 9,380,245 | B1 | 6/2016 | Guidash et al. |
| 9,749,569 | B2 | 8/2017 | Mabuchi et al. |
| 9,848,141 | B2 | 12/2017 | Panicacci et al. |

(Continued)

OTHER PUBLICATIONS

List of IBM Patents or Patent Applications Treated as Related, Mar. 22, 2019, 2 pages.

(Continued)

*Primary Examiner* — Jiangeng Sun
(74) *Attorney, Agent, or Firm* — Stephen J. Walder, Jr.; L. Jeffrey Kelly

(57) ABSTRACT

Mechanisms are provided for acceleration of convolutional neural networks on analog arrays. Input ports receive image signals from frames in an input image. Input memory arrays store the image signals received from the input ports into a respective input memory location to create a plurality of image sub-regions in input memory arrays. A distributor associated each of a set of analog array tiles in an analog array to a part of image sub-regions of the input memory arrays, so that one or more of a set of analog memory components is associated with the image signals in a distribution order to create a respective output signal. An assembler stores each of the respective output signals into one of a set of memory outputs in an output order that is determined by the distribution order.

20 Claims, 9 Drawing Sheets

(56) References Cited

U.S. PATENT DOCUMENTS

| | | | |
|---|---|---|---|
| 9,904,874 B2 | 2/2018 | Shoaib et al. | |
| 9,990,199 B2 | 6/2018 | Danielsson et al. | |
| 2015/0027237 A1* | 1/2015 | Chakrabartty | G11C 16/3486 |
| | | | 73/862.68 |
| 2016/0247565 A1 | 8/2016 | Perner et al. | |
| 2016/0379109 A1 | 12/2016 | Chung et al. | |
| 2017/0064236 A1 | 3/2017 | Gou et al. | |
| 2017/0103309 A1 | 4/2017 | Chang et al. | |
| 2017/0316312 A1 | 11/2017 | Goyal et al. | |
| 2018/0103224 A1 | 4/2018 | Hsu et al. | |
| 2019/0056987 A1* | 2/2019 | Busch | G06N 3/105 |
| 2019/0236755 A1* | 8/2019 | Killebrew | G06T 3/4007 |
| 2020/0117699 A1* | 4/2020 | Kim | G06N 3/00 |
| 2021/0374546 A1* | 12/2021 | Tsai | G06N 3/0454 |

OTHER PUBLICATIONS

Gokmen, Tayfun et al., "Training Deep Convolutional Neural Networks With Resistive Cross-Point Devices", IBM T. J. Watson Research Center, May 22, 2017, 22 Pages.

Hegde, Gopalakrishna et al., "CaffePresso: An Optimized Library For Deep Learning On Embedded Accelerator-Based Platforms", Cases IEEE Inter. Conf. On, Oct. 1-7, 2016, 10 Pages.

Ovtcharov, Kalin et al., "Accelerating Deep Convolutional Neural Networks Using Specialized Hardware", Microsoft Research, Feb. 22, 2015, 4 pages.

Shafiee, Ali et al., "ISAAC: A Convolutional Neural Network Accelerator with In-Situ Analog Arithmetic In Crossbar", ACM/IEEE ISCA 43rd Annual Inter. Symp. On, Jun. 18-22, 2016, 13 Pages.

* cited by examiner

ACCELERATION OF CONVOLUTIONAL NEURAL NETWORKS ON ANALOG ARRAYS

BACKGROUND

The present application relates generally to an improved data processing apparatus and method and more specifically to mechanisms for acceleration of convolutional neural networks on analog arrays.

In deep learning, a convolutional neural network (ConvNet) is a class of deep neural networks, most commonly applied to analyzing visual imagery. ConvNets use a variation of multilayer perceptrons designed to require minimal preprocessing. ConvNets are also known as shift invariant or space invariant artificial neural networks (SIANN), based on their shared-weights architecture and translation invariance characteristics. ConvNets were inspired by biological processes in that the connectivity pattern between neurons resembles the organization of the animal visual cortex. Individual cortical neurons respond to stimuli only in a restricted region of the visual field known as the receptive field. The receptive fields of different neurons partially overlap such that they cover the entire visual field. ConvNets use relatively little pre-processing compared to other image classification algorithms. This means that the network learns the filters that in traditional algorithms were hand-engineered. This independence from prior knowledge and human effort in feature design is a major advantage.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for acceleration of convolutional neural networks on analog arrays. The illustrative embodiments receive, via one or more input ports, image signals from one or more frames in an input image. The illustrative embodiments store, in one or more input memory arrays, the image signals received from the one or more input ports into a respective input memory location to create a plurality of image sub-regions in the one or more input memory arrays. In the illustrative embodiments, the image sub-regions being in an image sub-region order in the one or more input memory arrays. The illustrative embodiments associate, via a distributor, each of a set of analog array tiles in an analog array to a part of one or more image sub-regions of the one or more input memory arrays, so that one or more of a set of analog memory components is associated with one or more of the image signals in a distribution order to create a respective output signal. In the illustrative embodiments, each of the set of analog array tiles associated with a respective analog array tile in the set of analog array tiles in parallel with other analog array tiles of the set of analog array tiles. In the illustrative embodiments, each analog array tile having a plurality of analog memory components. In the illustrative embodiments, one or more of the set of analog memory components having weighting factors. The illustrative embodiments store, via an assembler, each of the respective output signals into one of a set of memory outputs in an output order that is determined by the distribution order. In the illustrative embodiments, the set of memory outputs being part of one or more output memory arrays with each memory output associated with a part of an output image.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Training deep networks is notoriously computationally intensive. The popularity of convolutional neural networks (ConvNets) is largely due to the reduced computational burden the ConvNets allow thanks to their parsimonious number of free parameters (as compared to fully connected networks), and their favorable mapping on existing graphic processing units.

Recently, speedup strategies of the matrix multiply-and-accumulate (MAC) operation (the computational workhorse of deep learning) based on mixed analog-digital approaches have been gaining increasing attention. Analog arrays of non-volatile memory provide an in-memory compute solution for deep learning that keeps the weights stationary. As a result, the forward, backward, and update steps of backpropagation algorithms may be performed with significantly reduced data movement. In general, these analog arrays rely on the idea of implementing matrix-vector multiplications on an array of analog devices by exploiting their Ohmic properties, resulting in a one-step constant time operation, i.e. with execution time independent of the matrix size (up to size limitations due to the device technology).

Matrix-matrix multiplications may harness this time advantage from analog arrays, but since matrix-matrix multiplications are implemented as a sequence of matrix-vector products, their execution time is proportional to the number of such products. In other words, the time required to multiply a matrix on an analog array of size $n_o \times n_s$ with an input matrix of size $n_s \times n_p$ is not proportional to the overall amount of compute ($\alpha n_o n_s n_p$, as for conventional hardware), but instead only scales linearly with the number of columns of the input matrix $n_p$ and is invariant with respect to the size of the matrix stored on the analog array ($n_o \times n_s$).

These considerations indicate that ConvNets do not map favorably onto analog arrays, as becomes clear when one formulates the convolution operation in terms of a matrix-matrix product (as detailed below with regard to detailed derivation). It turns out that kernel matrices (obtained by flattening and stacking convolution filters), are typically small, corresponding to a small size of the analog $n_o \times n_s$-array. More crucially, matrix-vector products need to be iterated $n_p$ times (the number of image patches), which is proportional to the total number of pixels in the input image and can thus be very large, particularly for early conv layers.

A common strategy to speed up training is to use data parallelism, where updates over large batches of data are computed in parallel on independent computing nodes and then averaged. However, this is not a practical solution to speed up training on analog arrays, since weight updates are computed only implicitly on stationary weights in non-volatile memory and are thus not directly accessible for averaging.

Figure 1:
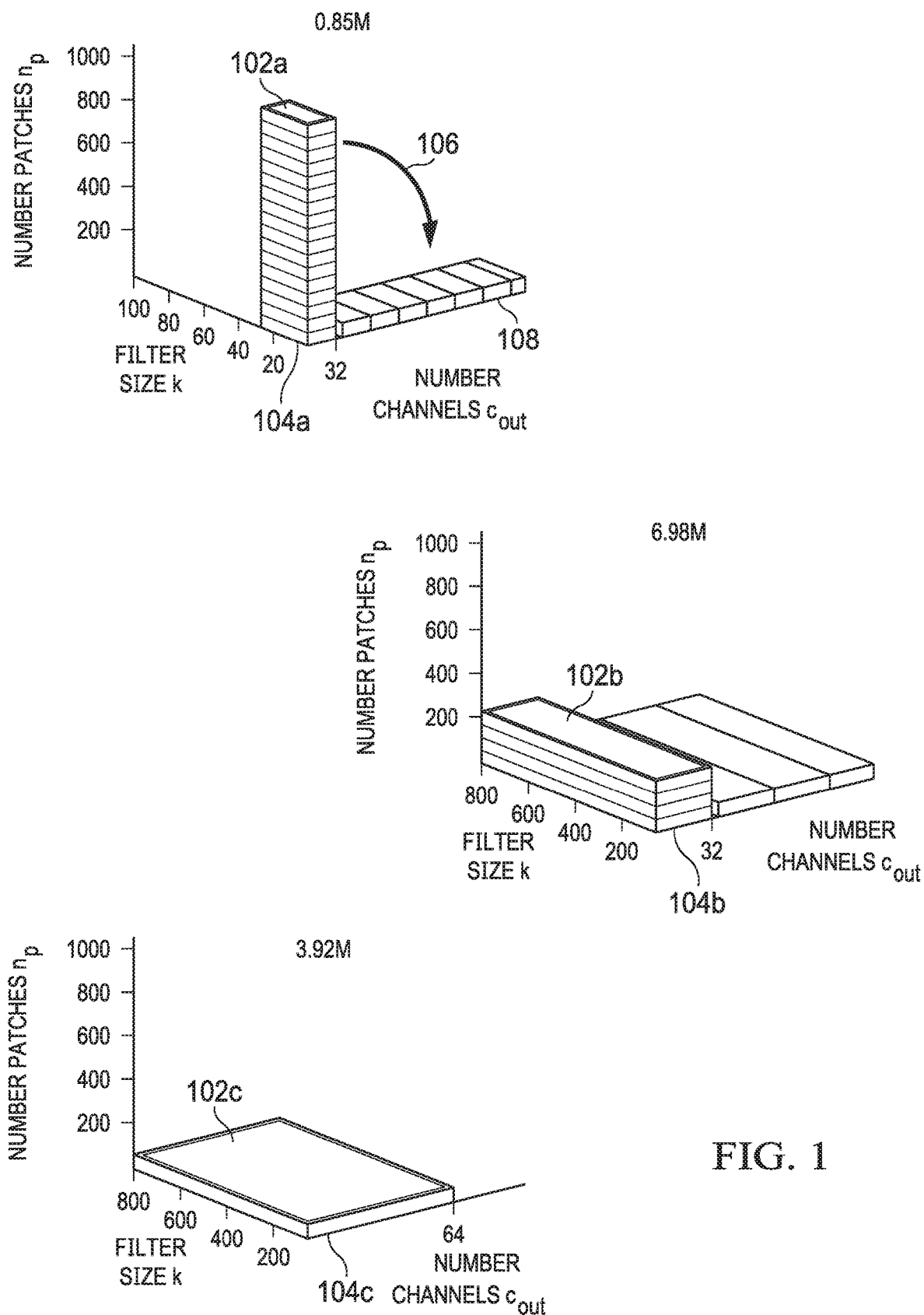
FIG. 1 depicts a replication of a kernel matrix onto $n_t$ separate analog arrays ("tiles") and to distribute the compute equally among the tiles in accordance with an illustrative embodiment.

Here, the illustrative embodiments provide a simple solution to accelerate ConvNets on analog arrays, which are referred to as Replicated Arrays with Permuted Assignment (RAPA) Convolution. The main idea is to use model parallelism to reduce the overall computation time on analog arrays (but not the amount of computation). Concretely, the illustrative embodiments provide replicating the kernel matrix onto $n_t$ separate analog arrays ("tiles"), and to distribute the compute equally among the tiles. FIG. 1 depicts a replication of a kernel matrix onto $n_t$ separate analog arrays ("tiles") and to distribute the compute equally among the tiles in accordance with an illustrative embodiment. That is, FIG. 1 depicts an amount of compute for the exemplary ConvNet (respective for the 3 layers). Areas 102a, 102b, and 102c ($k \times c_{out}$) indicate the size of the kernel matrices. Computing time for analog arrays is proportional only to $n_p$ and peaks at the first layer, while the amount of compute is $O(n_p k c_{out})$ (the volume of the cuboid 104a, 104b, and 104c; MACs in titles) and peaks at the second layer. For each layer, the illustrative embodiments distributes 106 the compute onto multiple replica of the kernel matrix residing on distinct arrays ("tiles"), indicated as tilings of the cuboids 108 into $n_t$=(16, 4, 1) small boxes, respectively. Since tiles are trained independently and in parallel, the compute time on analog arrays effectively becomes constant across layers (same height across layers; note, however, that the number of output channels of the convolution does not change). The tiling schemes refer to the way individual image patches are assigned to the tiles.

When this architecture proposed for analog arrays is simulated on conventional hardware, the architecture is equivalent to learning multiple kernel matrices independently for individual convolution layer. Thus, output pixels of the same image plane will be in general convolved with different filters. Note that the illustrative embodiments do not explicitly force the kernel matrices to be identical, which would recover the original convolution operation.

In the illustrative embodiments, the RAPA ConvNet is simulated in order to validate the effectiveness of different ways to distribute the compute among the tiles and show the possibilities to achieve superior performance to conventional ConvNets with the same kernel matrix sizes. The illustrative embodiments further prove analytically in a simplified model that for a random assignment of compute to tiles, the architecture is indeed implicitly regularized, such that tiles tend to learn similar kernel matrices. Finally, the illustrative embodiments find that the RAPA ConvNet is actually more robust to white-box adversarial attacks, since random assignment acts as a "confidence stabilization" mechanism that tends to balance overconfident predictions.

Convolution with analog arrays has been previously investigated. However, the study focused on the effects of device inaccuracies in the analog arrays on the final classification performance, and did not investigate how to accelerate the run time of ConvNets by algorithmic changes, which is the focus of the illustrative embodiments. Currently, no previous work has proposed an implementation of ConvNets that harnesses the favorable scaling properties of analog arrays. However, although proposed in a different context, some previous approaches share some similarities to the illustrative embodiment from an algorithmic perspective that are a special case of the algorithm proposed herein, where multiple kernel matrices are used to compute pixels on a regular grid. In contrast, the illustrative embodiments use random assignments of pixels to kernel matrices, and found superior performance and adversarial robustness. For completeness, the illustrative embodiments include the case of as a comparison in the experiments. Other approaches drop some patches in the convolution operation in order to accelerate run time on conventional GPUs, are also related to the proposal. The illustrative embodiments therefore include detailed experiments comparing in detail this approach with the inventive approach.

Analog Arrays

Figure 2:
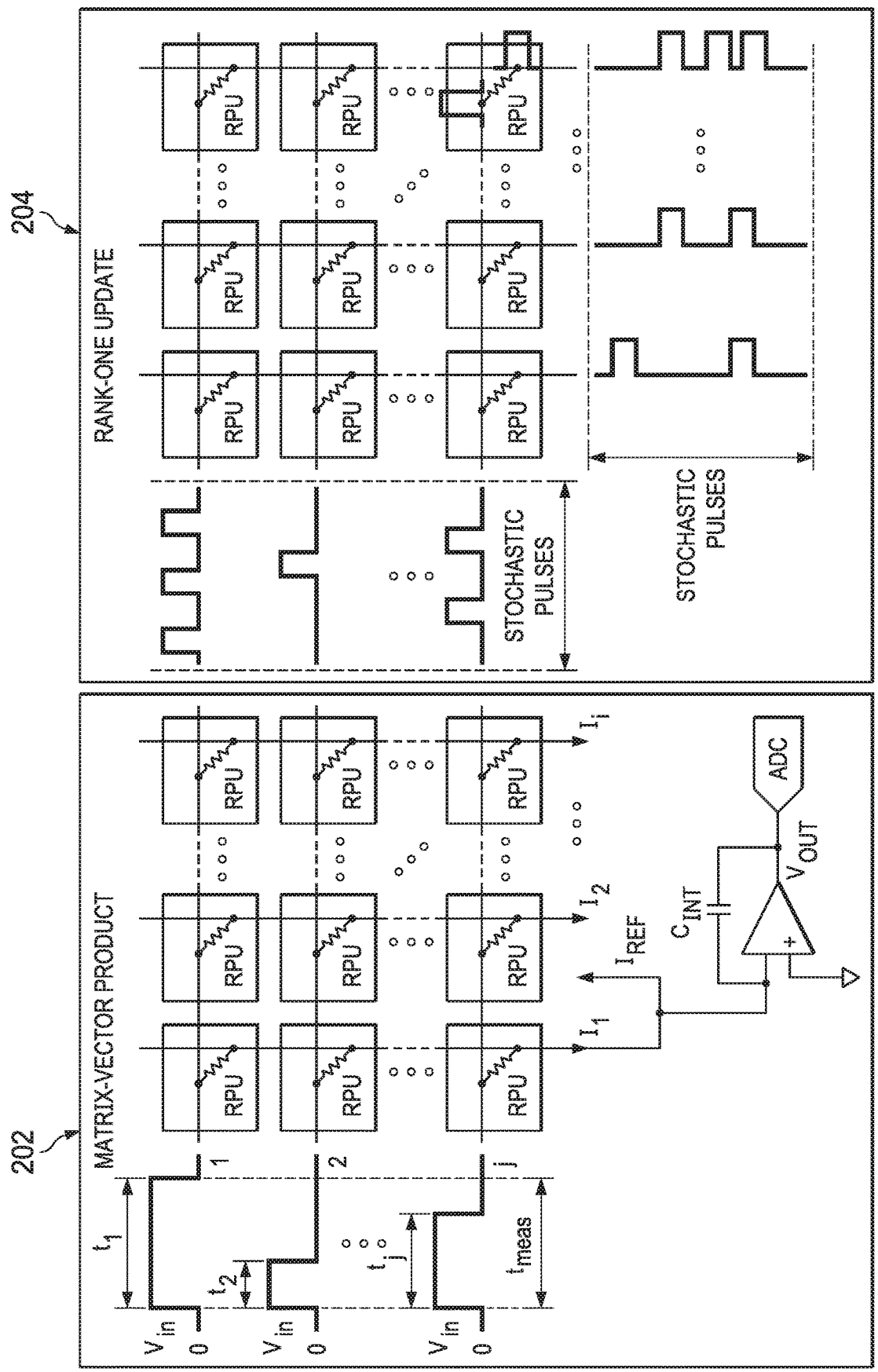
FIG. 2 illustrates how these constant scalings are achieved by virtue of Ohm's law and using stochastic pulse sequences in accordance with an illustrative embodiment.

Currently, a number of analog array technologies are under active development, based on different device materials as candidates for the implementation of the switching elements encoding the modifiable synaptic weights. While the exact detailed training dynamics and operations at inference time depend on the type of device materials implementing the weights, the main scaling properties of analog arrays are independent of the underlying technology. In particular, the fact that a matrix-vector multiplication (during the forward or backward pass) and a rank-one update (weights update) may be performed as single step operations, i.e. with running time independent of the size of the matrix, is a general property of analog arrays. FIG. 2 illustrates how these constant scalings are achieved by virtue of Ohm's law and using stochastic pulse sequences in accordance with an illustrative embodiment.

More specifically, FIG. 2 illustrates computing matrix-vector multiplications and rank-one updates with an analog arrays using Ohm's property. In the matric-vector product 202, an input vector is encoded as a sequence of voltage signals and is applied to the weights, which are represented by the conductivity of the crossbar elements (RPU: resistive processing unit), resulting in a series of multiply-and-accumulate operations, whose results are represented by the output currents. In the rank-one update 204, a parallel rank-one update of all the matrix elements may be achieved by application of random trains of voltage pulses at both ends of the array. If each weight is being updated only if pulses coincide on both terminals of the corresponding cross-point, the resulting update will on average coincide with the outer product between the vectors encoding the pulse probabilities.

Convolution with Replicated Kernel Matrices

Following common practice, the convolution of a filter of size $k_h \times k_w$ over an input image of size $h \times w \times c_{in}$ may be formulated as a matrix-matrix multiplication between an $n_p \times k$ im2col matrix I, constructed by stacking all $n_p$ (typically overlapping) image patches $b_i$ of size $k_h \times k_w \times c_{in}$ in rows of length $k = k_h k_w c_{in}$. The illustrative embodiments then write $I=(b1, \ldots, b_{n_p})^T \equiv (b_i^T)_{i \in \{1, \ldots, n_p\}}$. The matrix I is then multiplied by the $k \times c_{out}$ kernel matrix K, where $c_{out}$ is the number of output channels (i.e. the number of filters). The result $M=IK$ is of size $n_p \times c_{out}$, and is finally reshaped to a tensor with size $\tilde{h} \times \tilde{w} \times c_{out}$, to reflect the original image content.

In most ConvNets, conv layers are alternated with some form of pooling layers that reduce the spatial size typically by a factor of 2 (the pool stride). Thus, for the next convolutional layer, $n_p$ is reduced by a factor of 4 (square of the pool stride). On the other hand, because output channels become the input channels to the following layer, the size of K changes as well (see FIG. 1).

The illustrative embodiments parallelize the compute on analog arrays by using $n_t$ kernel matrices $K_j$ instead of just one K for a given convolution layer, and distributing the patches $b_i$ equally among them, so that at any given time $n_t$ matrix-vector products may be processed in parallel. Each of the $n_p$ patches is assigned to exactly one subset $S_j \subset \{1, \ldots, n_p\}$ (all of roughly equal size, $|S_j| \approx n_p/n_t$), and the individual array tiles effectively compute the sub-matrices $M_j = I_j K_j = (b_i^T)_{i \in S_j} K_j$. How the image patches are divided into the subsets $S_j$ in what is call "tiling scheme," described hereafter The final result is then obtained by re-ordering the rows according to their original index. In summary, with $s_i = j$ if $\in S_j$, the illustrative embodiments write $M_{tiled} = (b_i^T K_{s_i})_{i \in \{1, \ldots, n_p\}}$. Note that if all $K_j$ are identical, the tiled convolution trivially recovers the original convolution. Assuming that each kernel matrix $K_j$ resides on a separate analog array tile, and all resulting $I_j K_j$ operations may be computed in parallel, the overall computation is sped up by a factor of $n_t$ (neglecting the effort of the assignment, since that may be done efficiently on the digital side of the mixed analog-digital system).

Figure 3:
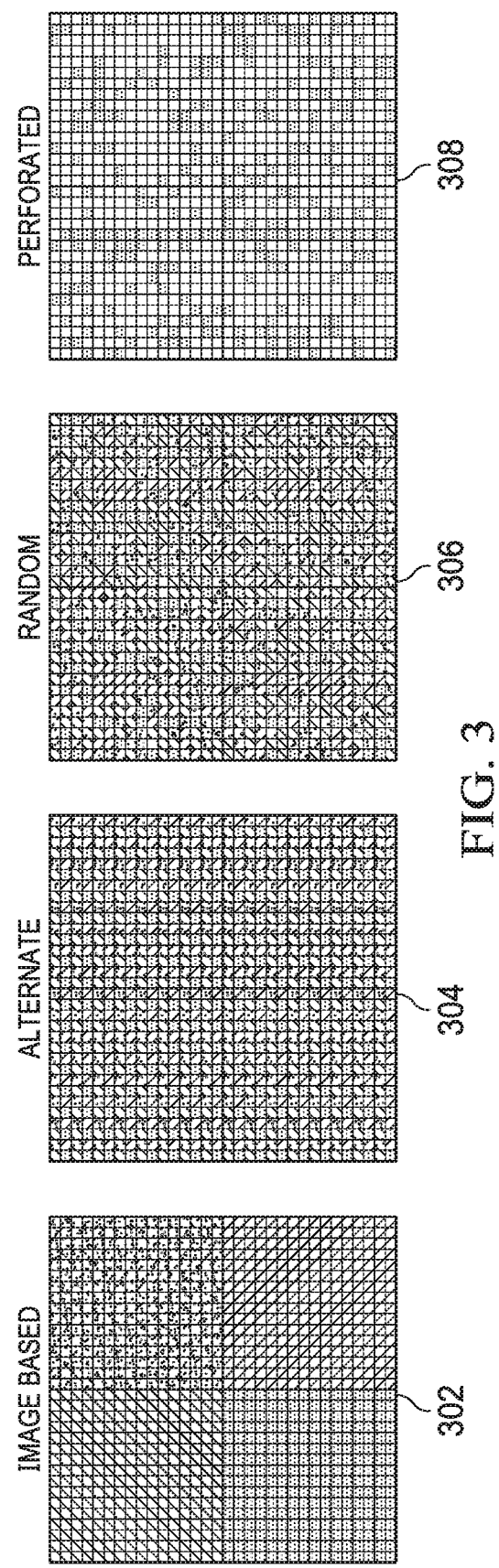
FIG. 3 depicts an exemplary output of a convolution layer for different tiling schemes ($n_t=4$, $c_{out}=1$) in accordance with an illustrative embodiment.

However, if all $K_j$ are learned independently and without explicit synchronization (a prerequisite for embarrassingly parallel execution) filters corresponding to the same output channel might in general be non-identical, which implies that $M_{tiled} \neq M$. Thus, learning all $K_j$ in parallel might negatively impact accuracy. In the following, the illustrative embodiments test how different tiling schemes affect the overall accuracy, such as image-based tiling, alternate tiling, random tiling, and perforated convolution. FIG. 3 depicts an exemplary output of a convolution layer for different tiling schemes ($n_t=4$, $c_{out}=1$) in accordance with an illustrative embodiment. Each output pixel might be computed with a kernel matrix from a different array tile (colors; white means zeros).

Image-Based Tiling

The image-based tiling scheme 302 comprises collecting all patches that contain pixels from a particular image region into a common subset $S_j$. If the image is a square with sides of length n and the number of tiles $n_t$ is a square number, $n_t = q^2$, the patch $b_i$ centered at pixel position $(x_i, y_i)$ with $x_i$, $y_i \in \{0, \ldots, n-1\}$ is assigned to the subset $S_{s_i}$, with $$s_i = \left\lfloor \frac{qx_i}{n} \right\rfloor + q \left\lfloor \frac{qy_i}{n} \right\rfloor + 1.$$

Note that image patches at the border will generally contain pixels from the neighboring regions, which may also be referred to as "image w/overlap". Alternatively, the pixels from other regions may be set to zero (as if padded in case of separate sub-images), which may also be referred to as "image w/pad".

Alternate Tiling

If the image is again a square and $n_t = q^2$, image patches that are neighboring to each other may be put into different subsets, so that neighboring image patches are assigned to alternate tiles as is shown in alternate tiling scheme 304. Specifically, $s_i = (x_i \bmod q) + q (y_i \bmod q) + 1$. This tiling is similar to the "tiled convolution" approach as a way to improve the learning of larger rotational and translational invariances within one convolutional layer.

Random Tiling

An alternative way of distributing $n_p$ image patches onto $n_t$ kernel matrices is to let the $S_j$ be a random partition of the set $\{1, \ldots, n_p\}$, with each of the $S_j$ having (roughly) the same size as is shown in random tiling scheme 306. The illustrative embodiments investigate two cases: one where the partition is drawn once at the beginning and fixed the remainder ("random fixed"), and the case where the illustrative embodiments sample a new partition for each train or test image ("random").

Perforated Convolution

An alternative way to speed up convolutions is to simply train a single kernel matrix with only a fraction $n_p/n_t$ of the data as is shown in perforated convolution scheme 308. As a result many output pixels will have zero value. Thus, in this scheme the illustrative embodiments draw a subset S of $n_p/n_t$ indices and set the rows for which $i \notin S$ to 0. The illustrative embodiments then resample S for each image during training and use all available image patches during testing. Note that in this scheme only a single kernel matrix is used.

Network Parameters Used in the Experiments

In order to illustrate the inventive nature of the illustrative embodiments, a battery of proof of concept experiments use a small standard ConvNet on 3 datasets: CIFAR-10, CIFAR-100, and SVHN. The network consists of 3 convolution layers with kernel size 5×5, and intermediate pooling layers of stride 2. Several options for the first 2 pooling layers were utilized as discussed hereafter, whereas the last pooling layer is fixed to an average pooling. Each convolution layer is followed by lateral response normalization, and the last convolution layer is followed by a fully connected layer. The illustrative embodiments also use a very small weight decay (0.0001 times the learning rate) and mini-batch of 10, train for >400 epochs and report the minimal test and train errors. The learning rate λ is annealed in a step-wise manner every 25 epochs with a factor $\lambda_\gamma$, and is manually optimized for max-pooling on CIFAR-10, then kept fixed for other datasets and pooling methods. If multiple runs on the datasets were made with different learning rate settings, the illustrative embodiments report the best test error. The tests found that λ=0.005 and $\lambda_\gamma$=0.5 for no tiling, and λ=0.05 and $\lambda_\gamma$=0.75 for tiling with $n_t$=(16, 4, 1) tiles seemed to work best, although different settings, e.g. λ=0.01 and $\lambda_\gamma$=0.9 yield mostly similar results. Note that the number of updates is effectively reduced per array tile, which may be in part compensated by increasing the learning rate. The illustrative embodiments additionally use a constant "warm up" period of 1 or 5 epochs with a learning rate reduced by a factor of 50.

The output channel setting of the network is 32, 32, 64 for the conv layers, respectively. Thus, for CIFAR-10 the network has 79328 weights (including biases) only in the conv layers. For tiling with $n_t$=(16, 4, 1) tiles, the number of convolutional weights are increased to 192704. To compare this against a network of roughly the same number of weights, the illustrative embodiments increase the number of channels for the non-tiled network to 54, 64, 64, which yields 193032 weights ("enlarged" network). However, note that for this larger network the amount of compute is actually increased, whereas the amount of compute of the tiled network is identical to the original smaller network.

For training, the illustrative embodiments used standard stochastic gradient descent. The illustrative embodiments use moderate image augmentations (mirroring and brightness changes). All experiments are implemented in Facebook's Caffe2 framework (using custom C++/CUDA operators, where necessary).

Finally, in addition to the usual pooling methods (max-pooling, average-pooling and stochastic pooling), the illustrative embodiments also applied mixed pooling to get the benefits of both max and average pooling. In particular, the illustrative embodiments use a learnable combination of average and max-pooling, with mixture parameters per channel $\alpha_k \in [0,1]$. To enforce these parameter limits, the illustrative embodiments set $$\alpha_k \equiv \frac{1}{1 + \exp^{\mu \beta_k}}$$

and train the $\beta_k$ with μ=10 fixed. Initial values are $\beta_k$=2/μ to ensure a bias towards max-pooling, which works best on the datasets used here.

Main Experimental Results

The aim here is to systematically quantify the relative impact of the convolutional tiling architecture on performance, not to reach state-of-the-art accuracy on the tested datasets. The illustrative embodiments therefore examine a relatively small standard ConvNet with 3 conv layers, as discussed previously.

Figure 4:
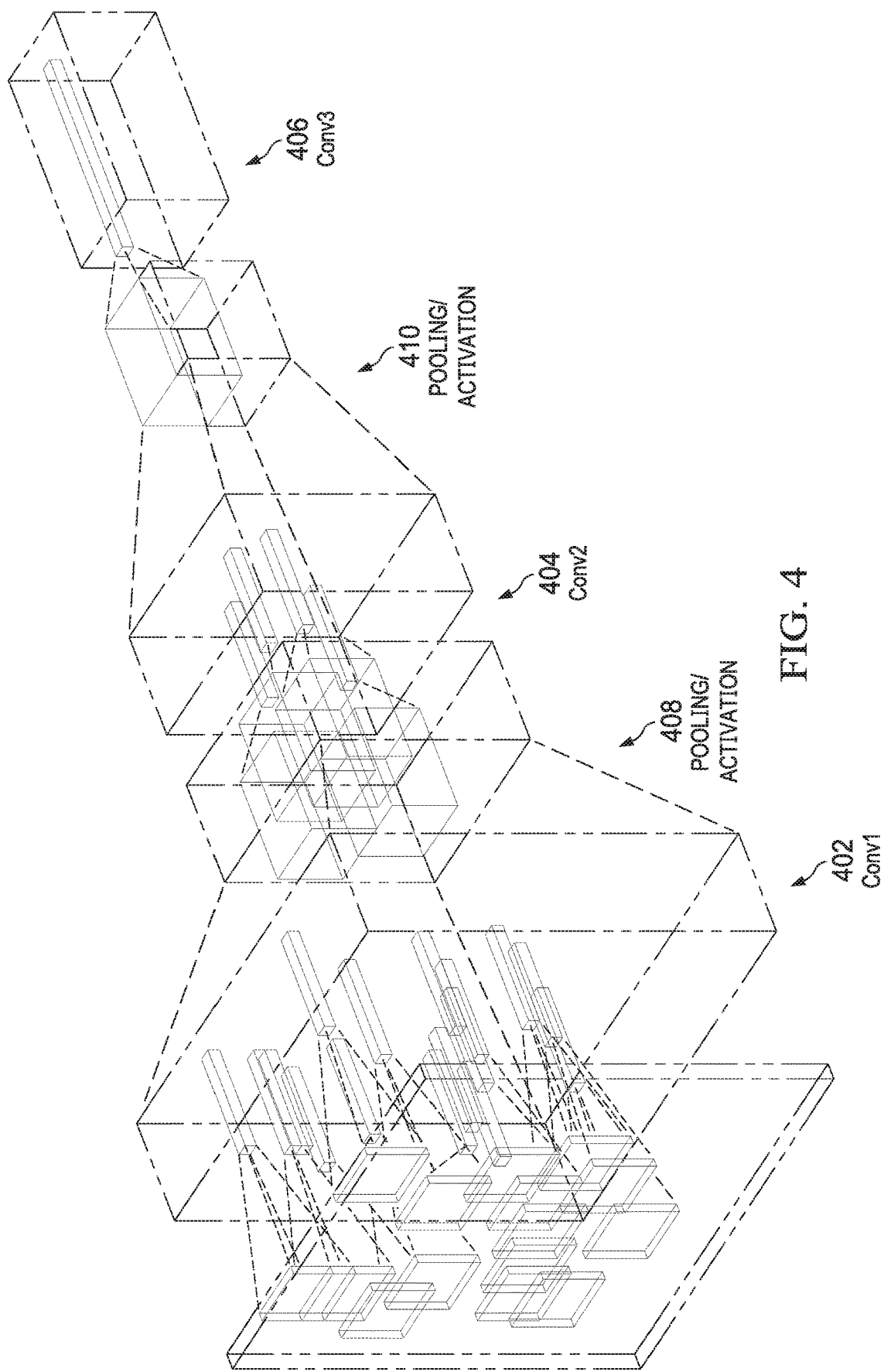
FIG. 4 depicts an exemplary illustration of this architecture in the case of random tiling in accordance with an illustrative embodiment.

As described, only the number $n_p$ of input patches per layer determines the run time on analog arrays. The illustrative embodiments thus divide the compute of each conv layer onto $n_t$ array tiles, so that the number of image patches per tile, $n_p/n_t$, is constant. Since the illustrative embodiments have $n_p$=(1024, 256, 64), the illustrative embodiments use $n_t$=(16, 4, 1) tiles for the 3 conv layers, respectively. Note that this architecture achieves perfect load-balancing, because each tile in the network learns a separate kernel matrix using 64 image patches per image. FIG. 4 depicts an exemplary illustration of this architecture in the case of random tiling in accordance with an illustrative embodiment. In FIG. 4, three convolution layers, layers 402, 404, and 406 are interleaved with pooling and activation 408 and 410. Note that only the convolutional layers are displayed, and the final stages (including the final pooling layer and the fully connected layer) are omitted in the diagram, since they identical to the original network. The first convolution layer ("Conv1", 402) uses 16 different kernel matrices (indicated with 16 different colors) and the image patches are randomly distributed among these (with a new random permutation drawn for each image). The second convolution layer ("Conv2", 404) uses 4 different kernel matrices (indicated with 4 different colors) and patches are similarly randomly distributed among those. The last convolution layer ("Conv3", 406) uses just 1 kernel matrix as for normal convolution layers. The number of replicated kernel matrices per layer are chosen to match computing times in each layer on analog arrays.

The illustrative embodiments tested the performance of this setup on the mentioned datasets with and without tiling, and comparing different tiling schemes (see Table 1). The main results from these experiments are: (1) Random tiling achieves the best performance among all tiling schemes; (2) Across datasets, random tiling actually beats the regular ConvNet with no tiling; (3) Simply subsampling the input images is not sufficient to explain the high performance of random tiling, since the perforated scheme performed poorly.

TABLE 1

Best test (train) error [%] for tiling schemes

| Tiling\Data | CIFAR-10 | SVHN | CIFAR-100 |
|---|---|---|---|
| no tiling | 18.85 (2.37) | 8.92 (1.96) | 47.99 (9.11) |
| perforated | 30.79 (25.93) | 13.02 (15.52) | 63.44 (50.17) |
| enlarged | 17.75 (0.25) | 8.79 (0.71) | 46.91 (1.72) |
| random [fixed] | 24.42 (3.86) | 11.28 (2.25) | 55.50 (23.72) |
| random | 17.67 (5.81) | 7.10 (4.13) | 48.10 (15.57) |
| image w/overlap | 24.52 (0.99) | 10.26 (3.01) | 53.22 (18.53) |
| image w/pad | 25.86 (6.53) | 11.26 (6.06) | 54.24 (28.80) |
| alternate | 21.02 (3.98) | 9.22 (2.99) | 52.08 (18.83) |

Filter Similarity Across Tiles

Since replicated kernel matrices are trained independently, it is interesting to examine the similarity of the filters at the end of training. Note that only for identical filters across tiles, the original convolution is recovered.

In general, two main factors tend to implicitly force kernel matrices to become similar during training: (a) input similarity and (b) error-signal similarity across tiles. Indeed, for the random tiling scheme, where the input distribution across tiles is identical on average, different replicated filters might tend to be more similar, but not for other tiling schemes. Indeed, if the illustrative embodiments quantify the average similarity S of the learned filters across array tiles (computing the average correlation coefficients between all pairs across tiles, averaged over output channels) the illustrative embodiments find low values for all tiling schemes trained with max-pooling (S<0.01), except for the random tiling scheme.

TABLE 2

Best test (train) error [%] for different pooling methods (CIFAR-10)

| | no tiling | no tiling, enlarged | random | random | random reduced |
|---|---|---|---|---|---|
| Network Channel | (32, 32, 64) | (54, 64, 64) | (32, 32, 64) | (32, 32, 64) | (32, 32, 64) |
| $n_t$ | (1, 1, 1) | (1, 1, 1) | (16, 4, 1) | (16, 4, 1) | (1, 1, 1) |
| Performance | single test | single test | single test | voting (5) | single test |
| max pooling | 18.93 (0.35) | 17.57 (0.04) | 17.67 (7.06) | 16.89 | 19.31 |
| average | 24.46 (4.29) | 23.28 (0.64) | 24.32 (7.64) | 24.23 | 24.51 |
| mixed | 18.19 (0.42) | 17.53 (0.04) | 17.37 (6.65) | 16.78 | 18.93 |
| stochastic | 20.09 (15.7) | 18.39 (11.02) | 21.15 (17.32) | 18.84 | 21.19 |

Figure 5A:
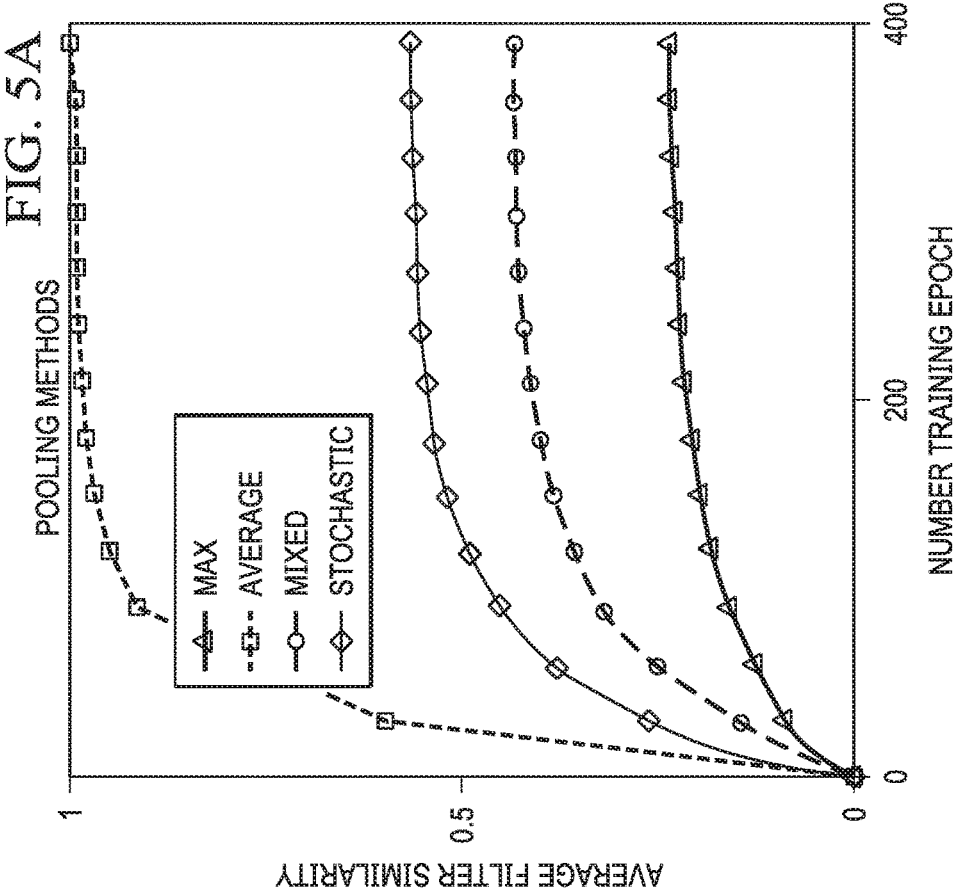
FIGS. 5A, 5B and 5C illustrate a similarity of learned kernel matrices $K_j$ for the first convolution in accordance with an illustrative embodiment.
Figure 5B:
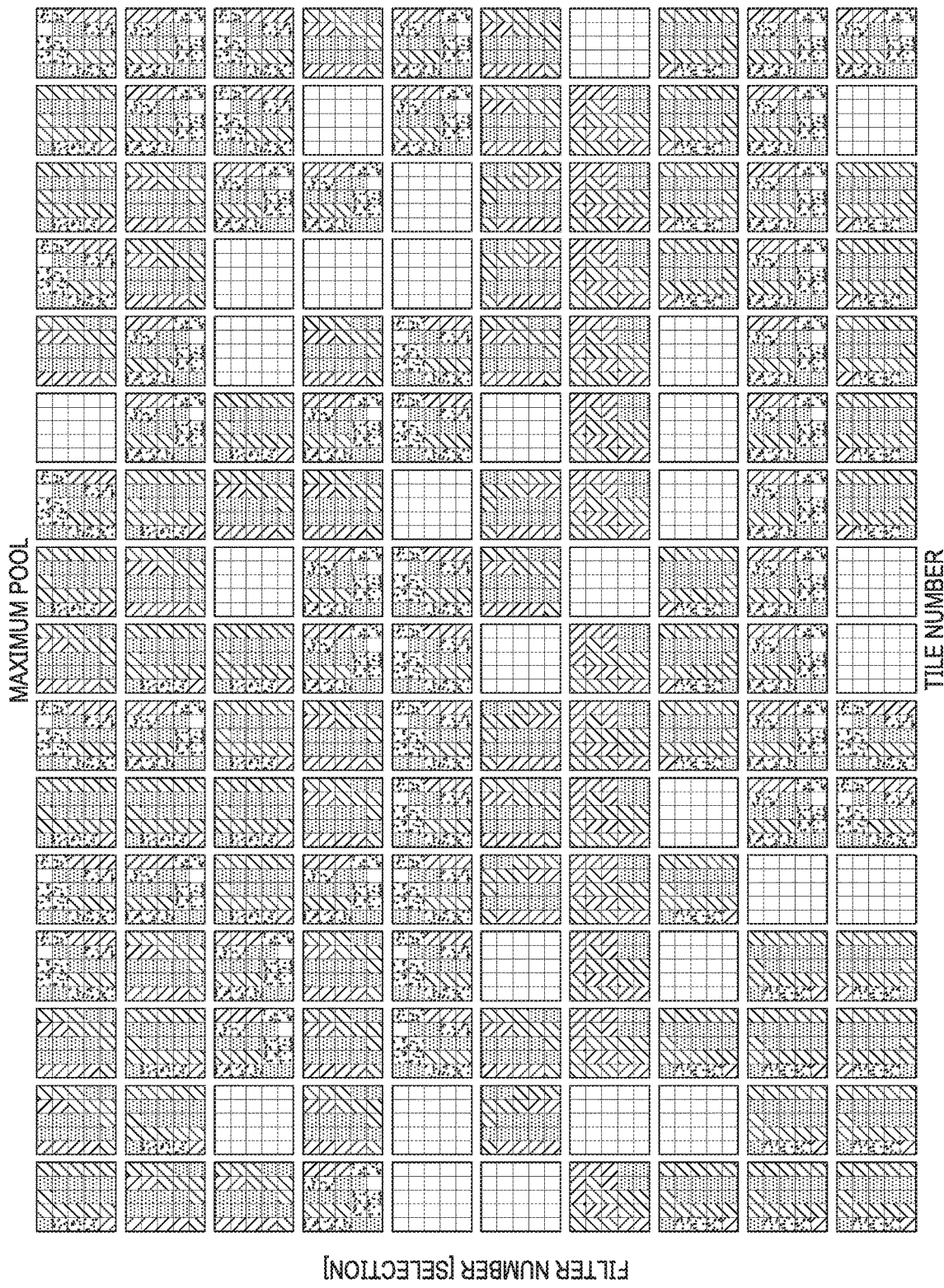
Figure 5C:
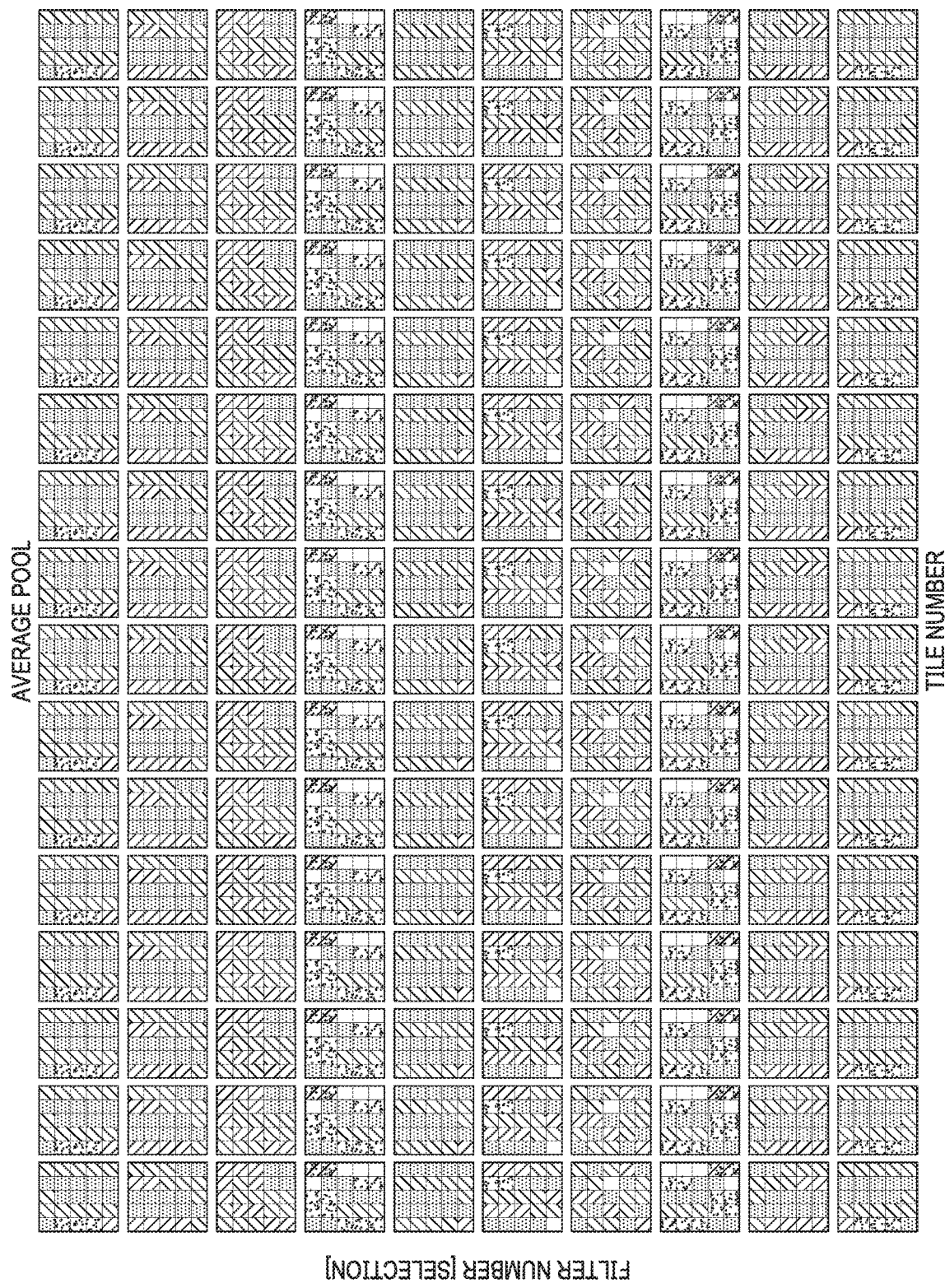

To investigate the effect of the error-signal, the illustrative embodiments further trained random tiling networks with different pooling methods on CIFAR-10, as shown in Table 2. For instance, in the case of average pooling, all tiles contributing to pixels in a pooling region will receive the same error signal, whereas for max-pooling only one output pixel per pooling region is selected and used to update the corresponding tile. FIGS. 5A, 5B and 5C illustrate a similarity of learned kernel matrices $K_j$ for the first convolution in accordance with an illustrative embodiment. FIG. 5A depicts an exemplary similarity of $K_j$ for random tiling and different pooling in accordance with an illustrative embodiment. FIG. 5B depicts an exemplary selection of 10 out of 32 filters (rows of $K_j$; reshaped) for all array tiles for max pooling in accordance with an illustrative embodiment. FIG. 5C, which is similar to 5B depicts an exemplary selection of 10 out of 32 filters (rows of $K_j$; reshaped) for all array tiles for average pooling in accordance with an illustrative embodiment. The illustrative embodiments found that performance for max pooling was superior to average pooling (see Table 2).

The illustrative embodiments found that all pooling methods induce some degree of similarity in case of random tiling (S>0.1; see FIG. 5B for example filters for max pooling). The illustrative embodiments found the highest similarity for average pooling, where all tiles learn almost identical filters (S≈1, see FIGS. 5A and 5C). However, average pooling gives poor performance, suggesting that some diversity among replicated kernel matrices might be advantageous. A good trade-off between similarity and performance may thus be obtained by using a learnable mixture between max and average pooling (FIG. 5A and Table 2 mixed pooling).

Comparison with Larger Model and Predictions Based on Majority Vote

The experiments show that random tiling matches or even outperforms the original network (see Table 1 and Table 2). However, since replicating kernel matrices onto multiple tiles effectively increases the number of free parameters in the network (by about a factor of 2.5, as discussed previously), it seems fair to compare the performance of the tiled network with a network with a similar number of free parameters arranged in conventional fashion. When increasing the number of channels of a non-tiled network (which however increases the amount of compute, as discussed previously), the illustrative embodiments indeed find that this enlarged network achieves a performance comparable to the random tiling network (see Table 1 and Table 2).

It is worth noticing that the performance of the random tiling network in Table 1 is obtained by sampling only one random assignment of patches to tiles during test. For each test image, the illustrative embodiments may instead generate multiple predictions, each generated by a different random assignment, and take as final output the majority vote of all predictions. The illustrative embodiments test this majority vote over 5 predictions, and see a performance gain of roughly 1% accuracy for the random tiling network, which then outperforms even the enlarged network with adjusted number of parameters (see Table 2 second last column). Note, however, that there is no performance gain in case of average pooling, where filters become almost identical (FIG. 5A), indicating an additional benefit of diversity among filter replica at test time.

Reduction of Tiled Network to the Original Architecture

It might be problematic for certain applications to retain multiple kernel matrices per conv layer. Thus, one might want to recover the original network, after benefiting from the training speedup of the tiled network. If the filters are very similar (as with average pooling) just taking a kernel matrix of any tile recovers the original convolution and the performance of the original network (see Table 2 last column).

One way to reduce the tiled model for mixed or max-pooling, is to select among all replica the filters that most often "wins" the maximum pooling on the training set. These may then be combined to form a single kernel matrix. An alternative simpler way is to just select across tiles the filter with the highest norm, since that indicates a filter that is more often used and updated, and therefore less subject to the weight decay penalty.

The illustrative embodiments tested this last reduction technique and found that the reduced network's performance is only slightly worse than the original network with conventional training (<0.75% for max/mixed pooling, see Table 2), indicating no need for retraining. However, note that reducing the network to the original architecture also removes the benefits of accelerated run time on analog arrays, the performance gain by majority voting, and the robustness to adversarial attacks (investigated below).

Theoretical Analysis: Implicit Regularization of Random Tiling

It is rather intriguing that the random tiling scheme achieves a performance that is comparable or even better than the standard ConvNet. One might have expected that as many as 16 replicated kernel matrices for one conv layer would have incurred overfitting. However, empirically, the random tiling actually tends to display less overfitting than the standard ConvNet. For example, in Table 2 (first row), the standard ConvNet (no tiling) achieves a test error of 18.93% with a training error close to zero, while random tiling has a better test error rate of 17.67% with higher training error (7.06%). In this section, the illustrative embodiments give a formal explanation of this phenomenon and show in a simplified model, a fully-connected logistic regression model, that replicating an architecture's parameters over multiple "tiles" that are randomly sampled during training acts as an implicit regularization that helps to avoid overfitting.

A logistic regression is a conditional distribution over outputs $y \in \{0,1\}$ given an input vector $x \in \mathbb{R}^d$ and a set of parameters $\theta \in \mathbb{R}^d$. The exponential family distribution form of the logistic regression is:

$$p(y|x,\theta) = \exp(y\, x\cdot\theta - A(x\cdot\theta))$$

where $A(z) = -\log(1-\sigma(z))$ and $\sigma(z) \equiv (1+\exp(-z))^{-1}$ is the logistic function. Note that this expression is equivalent to the more common form $p(y=1|x,\theta) = \sigma(x\cdot\theta)$. Training a logistic regression consists in finding parameters that minimize the empirical negative log-likelihood, $$l_{x,y}(\theta) = -\log p(y|x,\theta),$$

over a given set of N training examples $(x^i, y^i)$, resulting in the minimization of the loss:

$$L(\theta) = \sum_{i=1}^{N} l_{x^i,y^i}(\theta)$$

The illustrative embodiments model random tiling by assuming that every parameter $\theta_l$ is being replicated over $n_t$ tiles. Correspondingly, every time $\theta_l$ is being accessed, a parameter $\theta_l^{s_l}$ with $s_l$ randomly sampled in $\{1, \ldots, n_t\}$ is retrieved. The illustrative embodiments write $\theta^s \equiv (\theta_l^{s_l})_l$ and $s \equiv (s_l)_l$. As a result training can be expressed as the minimization of the average loss, $$\langle L(\theta^s)\rangle_s = \sum_{i=1}^{N} \langle l_{x^i,y^i}(\theta^s)\rangle_s$$

where the angular brackets $\langle \cdot \rangle_s$ indicate averaging over the process of randomly sampling every parameter $\theta_l$ from a tile $s_l$. With the above, the illustrative embodiments get $$\langle L(\theta^s)\rangle_s = -\sum_{i=1}^{N} (y^i x^i \cdot \bar{\theta} - \langle A(x^i \cdot \theta^s)\rangle_s)$$
$$= L(\bar{\theta}) + R(\{\theta^s\})$$

where $\bar{\theta}$ is the vector whose components are the parameters averaged across tiles, i.e. $\bar{\theta} = \langle \theta_l^{s_l}\rangle_s$, and $$R(\{\theta^s\}) = \Sigma_{i=1}^{N}(\langle A\cdot(x^i\cdot\theta^s)\rangle_s - A(x^i\cdot\bar{\theta})).$$

The term $R(\{\theta^s\})$ that falls out of this calculation has the role of a regularizer, since $R(\{\theta^s\})$ does not depend on the labels $y_i$. In a sense, it acts as an additional cost penalizing the deviations of the replicated parameters $\theta^s$ from their average value $\bar{\theta}$ across tiles. This tendency of the replicated parameters to move towards the mean counteracts the entropic pressure that training through stochastic gradient descent puts on the replica to move away from each other, therefore reducing the effective number of parameters. This implicit regularization effect explains why, despite the apparent over-parametrization due to replicating the parameters over tiles, the architecture of the illustrative embodiments does not seem to overfit more than its standard counterpart. It also explains the tendency of the tiles to synchronize causing the filters to become similar (FIG. 5).

Robustness Against Adversarial Examples

The illustrative embodiments gain further intuition on the role of the regularizer $R(\{\theta^s\})$ by developing its first term as a Taylor series up to second order around $x^i\cdot\bar{\theta}$. This results in:

$$R(\{\theta^s\}) \approx \frac{1}{2}\cdot\sum_{i=1}^{N} A''(x^i\cdot\bar{\theta})\sum_l (x_l^i)^2 \mathrm{Var}_s(\theta_l^{s_l}) =$$
$$\frac{1}{2}\cdot\sum_{i=1}^{N} p_i(1-p_i)\sum_l (x_l^i)^2 \mathrm{Var}_s(\theta_l^{s_l})$$

where $\mathrm{Var}_s(\theta_l^{s_l})$ is the variance of the parameter $\theta_l$ across tiles, and $p_i = \sigma(x^i\cdot\bar{\theta})$ is the predicted probability that $y^i = 1$ when considering the parameter mean $\bar{\theta}$. This penalty $R(\{\theta^s\})$ may be interpreted as trying to compensate for high-confidence predictions (for which the term $p_i(1-p_i)$ is small) by diminishing the pressure on $\mathrm{Var}_s(\theta_l^{s_l})$ to be small. As a result, samples $x^i$'s for which the prediction will tend to be confident will be multiplied by weights $\theta_l$ that will display a relatively large variability across replica, which in turn will tend to reduce the degree of confidence.

This "confidence stabilization" effect raises the intriguing possibility that random tiling mitigates the weaknesses due to a model excessively high prediction confidence. The efficacy of adversarial examples, i.e. samples obtained with small perturbations resulting in intentional high-confidence misclassifications, is such a type of weakness that plagues several machine learning models. The analysis, suggests that random tiling should help immunize a model against this type of attacks, by preventing the model from being fooled with high confidence.

Figure 6:
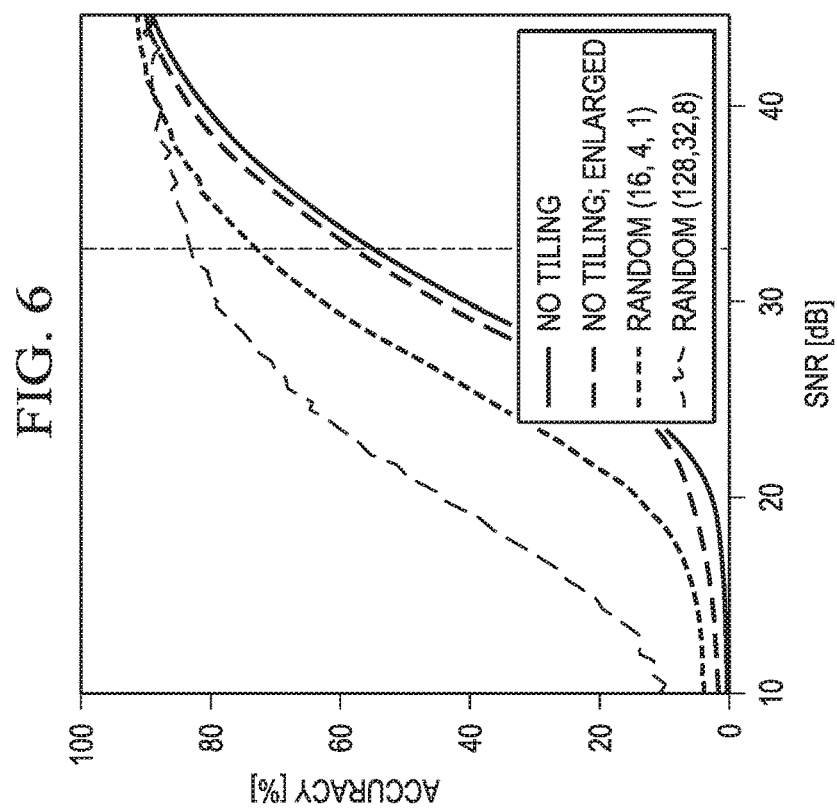
FIG. 6 illustrates that tiling improves robustness to adversarial examples in accordance with an illustrative embodiment.

The illustrative embodiments verify the theoretical prediction that random tiling increases the robustness to adversarial samples by using the Fast Gradient Sign Method (FSGM) to attack a network trained on CIFAR-10 with max-pooling (see performance results in Table 2). In particular, the illustrative embodiments compute the accuracy drop from all correctly classified images in the test set, due to a perturbation by noise in the direction of the signed error gradient (with strength $\varepsilon$). Following, the illustrative embodiments computed the drop in accuracy as a function of the signal-to-noise ratio resulting from adversarial noise (see FIG. 6 which illustrates that tiling improves robustness to adversarial examples in accordance with an illustrative embodiment). Note that using more kernel matrix replicas (here up to 128 for the first convolution) increases the robustness further.

At a noise level corresponding to the threshold of human perception, $\varepsilon \approx 33$, the illustrative embodiments find that random tiling reduces the gap to perfect adversarial robustness by around 41%. In comparison, other learning methods, such as or enhancing training examples with adversarial gradients reduces the gap on CIFAR-10 by around 6% and 54%, respectively (using their baseline Table 1). While the networks used here are not the same as those used in, the results still suggest that random tiling significantly improves robustness, with no loss in performance or extra training examples.

A strategy to further improve robustness is to increase the number of tiles in the random tiling network. If $n_t = (128, 32, 8)$ the network still trains fine, reaching a test error of 16.83% on CIFAR-10, which is similar to the $n_t = (16, 4, 1)$ tiled network (within 500 epochs; max-pool; majority vote of 9 tests. However, now robustness to adversarial attacks is significantly improved, reaching an accuracy of 83.97% for ε≈33 (see FIG. 6; dashed line), which translates to a reduction of the gap to perfect robustness by 64%. Note that, although the $n_t$=(128, 32, 8) network has now about 20 times more convolutional weights than the original non-tiled network, it trains well and does not overfit (training error 15%) and, neglecting peripheral costs and assuming parallel execution of all analog array tiles in a layer, would execute a training epoch 128 times faster than the original network.

Discussion

Thus, the illustrative embodiments propose a modification of ConvNets that allows for their favorable implementation onto upcoming mixed analog-digital hardware. The technique relies on the main idea of randomly dividing the computation load corresponding to one convolution operation among multiple independently and simultaneously trained kernel matrices. Remarkably, the stochastic strategy yields no loss in accuracy. If executed on parallel analog arrays, the architecture has the added advantage of being able to theoretically achieve a linear speedup as a function of number of tiles. Moreover, the provided theoretical analysis of the algorithm explains its properties by connecting the random assignment across tiles with an implicit form of regularization, and, additionally, reveals a "confidence stabilization" effect resulting in increased robustness towards adversarial attacks.

Several regularization procedures based on randomization have been proposed in the literature: dropout and dropconnect are popular recent ones. The finding that randomly splitting convolutions among several parallel tiles has a regularization effect is thus in line with this body of work. However, randomness in these regularization methods is typically restricted to the training phase, whereas the network architecture is fixed during testing. In contrast, because the main goal of the randomization procedure is to speed up the computation through parallelization, random tiling is carried out both a training and at test time.

It has been found recently, although in a different context, that some forms of randomness during testing are indeed well suited for mitigating adversarial effects, which is similar to the finding. However, while the authors randomize only on the input level (image resizing or random padding), the architecture has built-in randomness in the convolutional layer, so that no change in the input images needs to be made to achieve the adversarial robustness.

The illustrative embodiments studied and validated the principles of the architecture in a small standard ConvNet. However, it is expected that the tiling architecture to be applicable also to larger ConvNets, because they generally successively reduce the spatial size with depth through pooling and thus have a similar pattern of the amount of compute per layer as the example network (FIG. 1). For instance, an efficient tiling of the architecture would be $n_t$=(14, 4, 1, 1, 1). This would achieve perfect load-balancing across the 5 conv layers on analog arrays. Note that if set-up in this way, the whole network (including the fully connected layers) can additionally be pipelined across image batches, because the duration of computation would be identical for each of the conv layers (irrespective of the different filter sizes and numbers of channels).

There are many different approaches to accelerate deep learning using current hardware. The approach of the illustrative embodiments is motivated by the constraints of mixed-analog digital hardware to emphasize its advantages. In the tiling approach, although the total amount of compute in the network is kept constant (contrary to e.g. methods that perforate the loop, or use low-rank approximations or low precision weights, the number of updates per weight is nevertheless reduced, which might generally affect learning curves. Importantly, however, this does not seem to have an impact on the number of training epochs needed to achieve a performance close to the best performance of conventional networks. In fact, the random tiling network (with majority vote) reaches a test error of 19% (mixed pooling, see Table 2) after 85 epochs versus 82 for the original network. Admittedly, if one is instead interested in reaching the superior performance of the random tiling network, one would typically need to add additional training time. To what degree the added training time could be reduced by heterogeneous learning rates across the tiled network, is subject of future research.

Finally, another interesting research direction is how the performance of RAPA ConvNets could be further improved by increasing the convolution filter size or the number of filters per layer. Remarkably, this type of modifications, which are generally avoided on GPUs for reasons of efficiency, would not alter the overall run time on upcoming mixed analog-digital hardware technology.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 8:
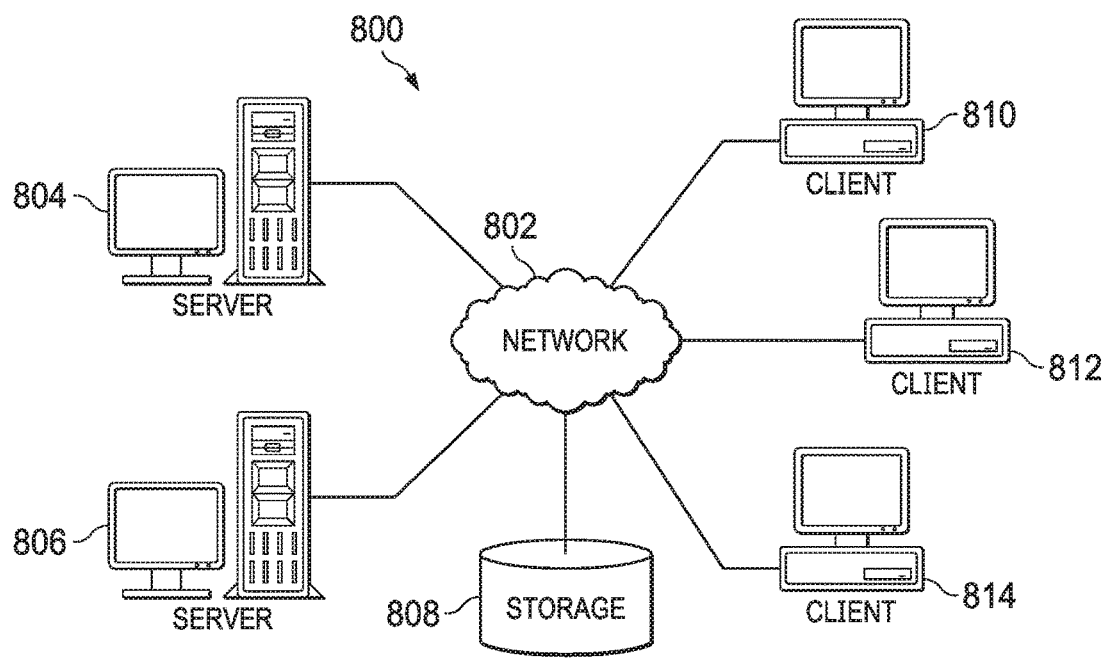
FIG. 8 is an example diagram of a distributed data processing system in which aspects of the illustrative embodiments may be implemented.
Figure 9:
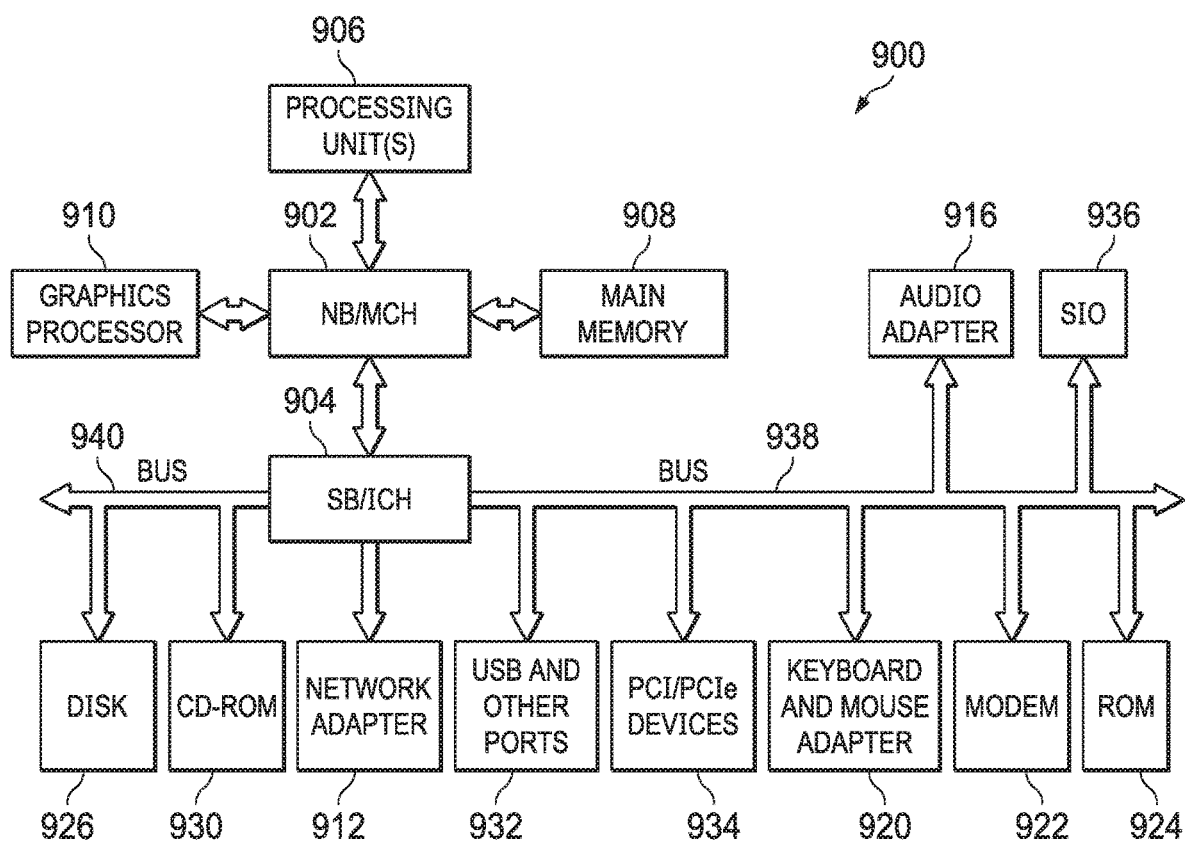
FIG. 9 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 8 and 9 are provided hereafter as example environments in which aspects of the illustrative embodiments may be implemented. It should be appreciated that FIGS. 8 and 9 are only examples and are not intended to assert or imply any limitation with regard to the environments in which aspects or embodiments of the present invention may be implemented. Many modifications to the depicted environments may be made without departing from the spirit and scope of the present invention.

FIG. 8 depicts a pictorial representation of an example distributed data processing system in which aspects of the illustrative embodiments may be implemented. Distributed data processing system 800 may include a network of computers in which aspects of the illustrative embodiments may be implemented. The distributed data processing system 800 contains at least one network 802, which is the medium used to provide communication links between various devices and computers connected together within distributed data processing system 800. The network 802 may include connections, such as wire, wireless communication links, or fiber optic cables.

In the depicted example, server 804 and server 806 are connected to network 802 along with storage unit 808. In addition, clients 810, 812, and 814 are also connected to network 802. These clients 810, 812, and 814 may be, for example, personal computers, network computers, or the like. In the depicted example, server 804 provides data, such as boot files, operating system images, and applications to the clients 810, 812, and 814. Clients 810, 812, and 814 are clients to server 804 in the depicted example. Distributed data processing system 800 may include additional servers, clients, and other devices not shown.

In the depicted example, distributed data processing system 800 is the Internet with network 802 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 800 may also be implemented to include a number of different types of networks, such as for example, an intranet, a local area network (LAN), a wide area network (WAN), or the like. As stated above, FIG. 8 is intended as an example, not as an architectural limitation for different embodiments of the present invention, and therefore, the particular elements shown in FIG. 8 should not be considered limiting with regard to the environments in which the illustrative embodiments of the present invention may be implemented.

As shown in FIG. 8, one or more of the computing devices, e.g., server 804, may be specifically configured to implement a convolutional neural network accelerator on analog arrays. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 804, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates acceleration of convolutional neural networks on analog arrays.

As noted above, the mechanisms of the illustrative embodiments utilize specifically configured computing devices, or data processing systems, to perform the operations for accelerating convolutional neural networks on analog arrays. These computing devices, or data processing systems, may comprise various hardware elements which are specifically configured, either through hardware configuration, software configuration, or a combination of hardware and software configuration, to implement one or more of the systems/subsystems described herein. FIG. 9 is a block diagram of just one example data processing system in which aspects of the illustrative embodiments may be implemented. Data processing system 900 is an example of a computer, such as server 804 in FIG. 8, in which computer usable code or instructions implementing the processes and aspects of the illustrative embodiments of the present invention may be located and/or executed so as to achieve the operation, output, and external effects of the illustrative embodiments as described herein.

In the depicted example, data processing system 900 employs a hub architecture including north bridge and memory controller hub (NB/MCH) 902 and south bridge and input/output (I/O) controller hub (SB/ICH) 904. Processing unit 906, main memory 908, and graphics processor 910 are connected to NB/MCH 902. Graphics processor 910 may be connected to NB/MCH 902 through an accelerated graphics port (AGP).

In the depicted example, local area network (LAN) adapter 912 connects to SB/ICH 904. Audio adapter 916, keyboard and mouse adapter 920, modem 922, read only memory (ROM) 924, hard disk drive (HDD) 926, CD-ROM drive 930, universal serial bus (USB) ports and other communication ports 932, and PCI/PCIe devices 934 connect to SB/ICH 904 through bus 938 and bus 940. PCI/PCIe devices may include, for example, Ethernet adapters, add-in cards, and PC cards for notebook computers. PCI uses a card bus controller, while PCIe does not. ROM 924 may be, for example, a flash basic input/output system (BIOS).

HDD 926 and CD-ROM drive 930 connect to SB/ICH 904 through bus 940. HDD 926 and CD-ROM drive 930 may use, for example, an integrated drive electronics (IDE) or serial advanced technology attachment (SATA) interface. Super I/O (SIO) device 936 may be connected to SB/ICH 904.

An operating system runs on processing unit 906. The operating system coordinates and provides control of various components within the data processing system 900 in FIG. 9. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 900.

As a server, data processing system 900 may be, for example, an IBM eServer™ System p® computer system, Power™ processor based computer system, or the like, running the Advanced Interactive Executive (AIX®) operating system or the LINUX® operating system. Data processing system 900 may be a symmetric multiprocessor (SMP) system including a plurality of processors in processing unit 906. Alternatively, a single processor system may be employed.

Instructions for the operating system, the object-oriented programming system, and applications or programs are located on storage devices, such as HDD 926, and may be loaded into main memory 908 for execution by processing unit 906. The processes for illustrative embodiments of the present invention may be performed by processing unit 906 using computer usable program code, which may be located in a memory such as, for example, main memory 908, ROM 924, or in one or more peripheral devices 926 and 930, for example.

A bus system, such as bus 938 or bus 940 as shown in FIG. 9, may be comprised of one or more buses. Of course, the bus system may be implemented using any type of communication fabric or architecture that provides for a transfer of data between different components or devices attached to the fabric or architecture. A communication unit, such as modem 922 or network adapter 912 of FIG. 9, may include one or more devices used to transmit and receive data. A memory may be, for example, main memory 908, ROM 924, or a cache such as found in NB/MCH 902 in FIG. 9.

As mentioned above, in some illustrative embodiments the mechanisms of the illustrative embodiments may be implemented as application specific hardware, firmware, or the like, application software stored in a storage device, such as HDD 926 and loaded into memory, such as main memory 908, for executed by one or more hardware processors, such as processing unit 906, or the like. As such, the computing device shown in FIG. 9 becomes specifically configured to implement the mechanisms of the illustrative embodiments and specifically configured to perform the operations and generate the outputs described hereafter with regard to the a convolutional neural network accelerator on analog arrays.

Those of ordinary skill in the art will appreciate that the hardware in FIGS. 8 and 9 may vary depending on the implementation. Other internal hardware or peripheral devices, such as flash memory, equivalent non-volatile memory, or optical disk drives and the like, may be used in addition to or in place of the hardware depicted in FIGS. 8 and 9. Also, the processes of the illustrative embodiments may be applied to a multiprocessor data processing system, other than the SMP system mentioned previously, without departing from the spirit and scope of the present invention.

Moreover, the data processing system 900 may take the form of any of a number of different data processing systems including client computing devices, server computing devices, a tablet computer, laptop computer, telephone or other communication device, a personal digital assistant (PDA), or the like. In some illustrative examples, data processing system 900 may be a portable computing device that is configured with flash memory to provide non-volatile memory for storing operating system files and/or user-generated data, for example. Essentially, data processing system 900 may be any known or later developed data processing system without architectural limitation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
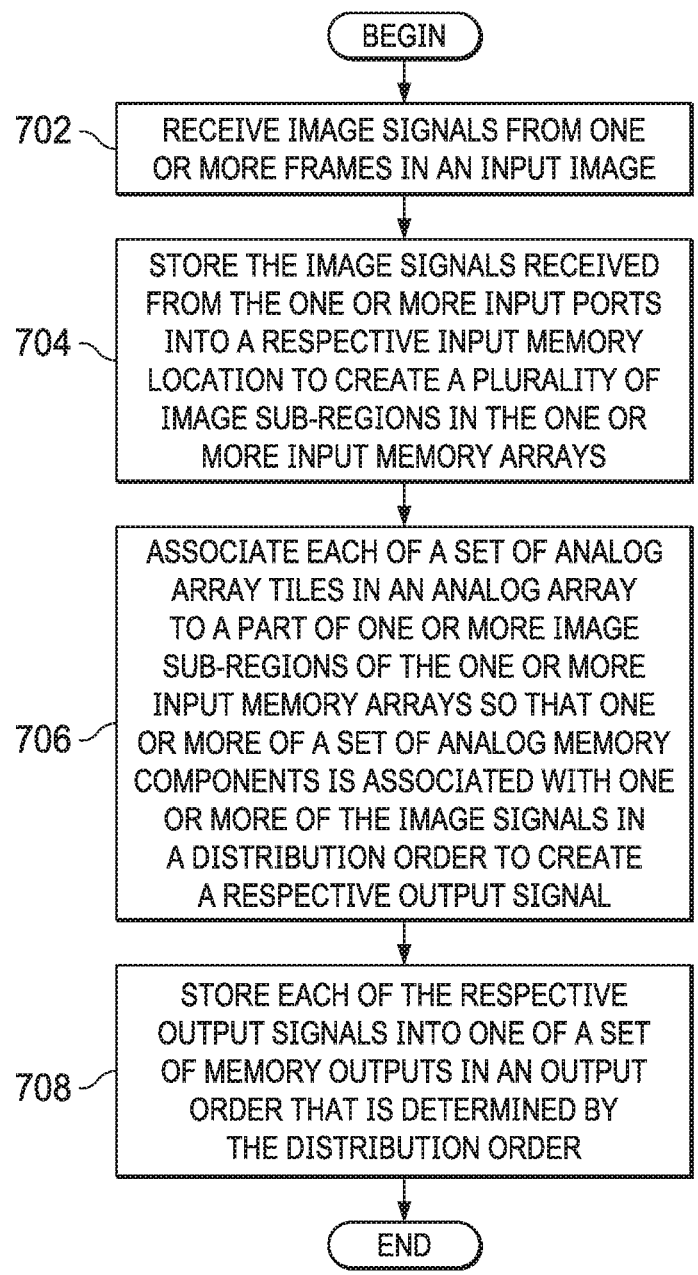
FIG. 7 depicts an exemplary flowchart of the operation performed in accelerating convolutional neural networks on analog arrays in accordance with an illustrative embodiment.

FIG. 7 depicts an exemplary flowchart of the operation performed in accelerating convolutional neural networks on analog arrays in accordance with an illustrative embodiment. As the operation begins, one or more input ports receive image signals from one or more frames in an input image (step 702). One or more input memory arrays store the image signals received from the one or more input ports into a respective input memory location to create a plurality of image sub-regions in the one or more input memory arrays (step 704). The image sub-regions being in an image sub-region order in the one or more input memory arrays. A distributor associates each of a set of analog array tiles in an analog array to a part of one or more image sub-regions of the one or more input memory arrays so that one or more of a set of analog memory components is associated with one or more of the image signals in a distribution order to create a respective output signal (step 706). Each of the set of analog array tiles are associated with a respective analog array tile in the set of analog array tiles in parallel with other analog array tiles of the set of analog array tiles. Each analog array tile has a plurality of analog memory components and one or more of the set of analog memory components having weighting factors. An assembler stores each of the respective output signals into one of a set of memory outputs in an output order that is determined by the distribution order (step 708). The set of memory outputs are part of one or more output memory arrays with each memory output associated with a part of an output image.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for acceleration of convolutional neural networks on analog arrays comprising:
   a processor; and
   a memory coupled to the processor, wherein the memory comprises instructions which, when executed by the processor, cause the processor to:
   receive, via one or more input ports, image signals from one or more frames in an input image;
   store, in one or more input memory arrays, the image signals received from the one or more input ports into a respective input memory location to create a plurality of image sub-regions in the one or more input memory arrays, the image sub-regions being in an image sub-region order in the one or more input memory arrays;
   associate, via a distributor, each of a set of analog array tiles in an analog array to a part of one or more image sub-regions of the one or more input memory arrays, so that one or more of a set of analog memory components is associated with one or more of the image signals in a distribution order to create a respective output signal, each of the set of analog array tiles associated with a respective analog array tile in the set of analog array tiles in parallel with other analog array tiles of the set of analog array tiles, each analog array tile having a plurality of analog memory components, one or more of the set of analog memory components having weighting factors; and
   store, via an assembler, each of the respective output signals into one of a set of memory outputs in an output order that is determined by the distribution order, the set of memory outputs being part of one or more output memory arrays with each memory output associated with a part of an output image.

2. The system of claim 1, wherein one or more of the plurality of image sub-regions is an n×n pixel region of the input image.

3. The system of claim 1, wherein the image sub-region order includes having one or more image sub-regions of the plurality of image sub-regions overlap one or more other image sub-regions.

4. The system of claim 1, wherein the one or more image sub-regions are stored in one linear element of the one or more input memory arrays.

5. The system of claim 1, wherein the analog array is one or more of: a discrete analog array, a cross-bar switch analog array, a configurable analog array, an array of analog switches, or a resistive process unit (RPU).

6. The system of claim 1, wherein the weighting factors in the analog array dynamically change as a result of the distribution by back propagation.

7. The system of claim 1, wherein a size, a shape, or a number of the set of analog array tiles in the analog array is re-configurable.

8. The system of claim 1, wherein the output order of the assembler is a row position in the set of memory outputs that corresponds to the row position on a memory input.

9. The system of claim 1, wherein multiple analog array tiles are randomly associated with an image sub-regions.

10. The system of claim 1, wherein the distribution order is one or more of random tiling, perforated convolution, image-based tiling, or alternate tiling.

11. A method, in a data processing system, for acceleration of convolutional neural networks on analog arrays, the method comprising:
    receiving, via one or more input ports, image signals from one or more frames in an input image;
    storing, in one or more input memory arrays, the image signals received from the one or more input ports into a respective input memory location to create a plurality of image sub-regions in the one or more input memory arrays, the image sub-regions being in an image sub-region order in the one or more input memory arrays;
    associating, via a distributor, each of a set of analog array tiles in an analog array to a part of one or more image sub-regions of the one or more input memory arrays, so that one or more of a set of analog memory components is associated with one or more of the image signals in a distribution order to create a respective output signal, each of the set of analog array tiles associated with a respective analog array tile in the set of analog array tiles in parallel with other analog array tiles of the set of analog array tiles, each analog array tile having a plurality of analog memory components, one or more of the set of analog memory components having weighting factors; and
    storing, via an assembler, each of the respective output signals into one of a set of memory outputs in an output order that is determined by the distribution order, the set of memory outputs being part of one or more output memory arrays with each memory output associated with a part of an output image.

12. The method of claim 11, wherein one or more of the plurality of image sub-regions is an n×n pixel region of the input image.

13. The method of claim 11, wherein the image sub-region order includes having one or more image sub-regions of the plurality of image sub-regions overlap one or more other image sub-regions.

14. The method of claim 11, wherein the one or more image sub-regions are stored in one linear element of the one or more input memory arrays.

15. The method of claim 11, wherein the analog array is one or more of: a discrete analog array, a cross-bar switch analog array, a configurable analog array, an array of analog switches, or a resistive process unit (RPU).

16. The method of claim 11, wherein a size, a shape, or a number of the set of analog array tiles in the analog array is re-configurable.

17. The method of claim 11, wherein the output order of the assembler is a row position in the set of memory outputs that corresponds to the row position on a memory input.

18. The method of claim 11, wherein multiple analog array tiles are randomly associated with an image sub-regions.

19. The method of claim 11, wherein the distribution order is one or more of random tiling, perforated convolution, image-based tiling, or alternate tiling.

20. A computer program product comprising a computer readable storage medium having a computer readable program for acceleration of convolutional neural networks on analog arrays stored therein, wherein the computer readable program, when executed on a computing device, causes the computing device to:

receive, via one or more input ports, image signals from one or more frames in an input image;

store, in one or more input memory arrays, the image signals received from the one or more input ports into a respective input memory location to create a plurality of image sub-regions in the one or more input memory arrays, the image sub-regions being in an image sub-region order in the one or more input memory arrays;

associate, via a distributor, each of a set of analog array tiles in an analog array to a part of one or more image sub-regions of the one or more input memory arrays, so that one or more of a set of analog memory components is associated with one or more of the image signals in a distribution order to create a respective output signal, each of the set of analog array tiles associated with a respective analog array tile in the set of analog array tiles in parallel with other analog array tiles of the set of analog array tiles, each analog array tile having a plurality of analog memory components, one or more of the set of analog memory components having weighting factors; and store, via an assembler, each of the respective output signals into one of a set of memory outputs in an output order that is determined by the distribution order, the set of memory outputs being part of one or more output memory arrays with each memory output associated with a part of an output image.

* * * * *